Arthur A. Smith,
INVENTOR

Arthur A. Smith, INVENTOR

Nov. 9, 1971 A. A. SMITH 3,618,451
LOADER MECHANISM FOR AN AUTOMATIC ROCKET LAUNCHER
Filed Nov. 3, 1969 6 Sheets-Sheet 4

Arthur A. Smith,
INVENTOR
Harry M. Saragovitz
Edward J. Kelly
Herbert Berl
Harold W. Hilton
BY Arthur A. Smith
INVENTOR

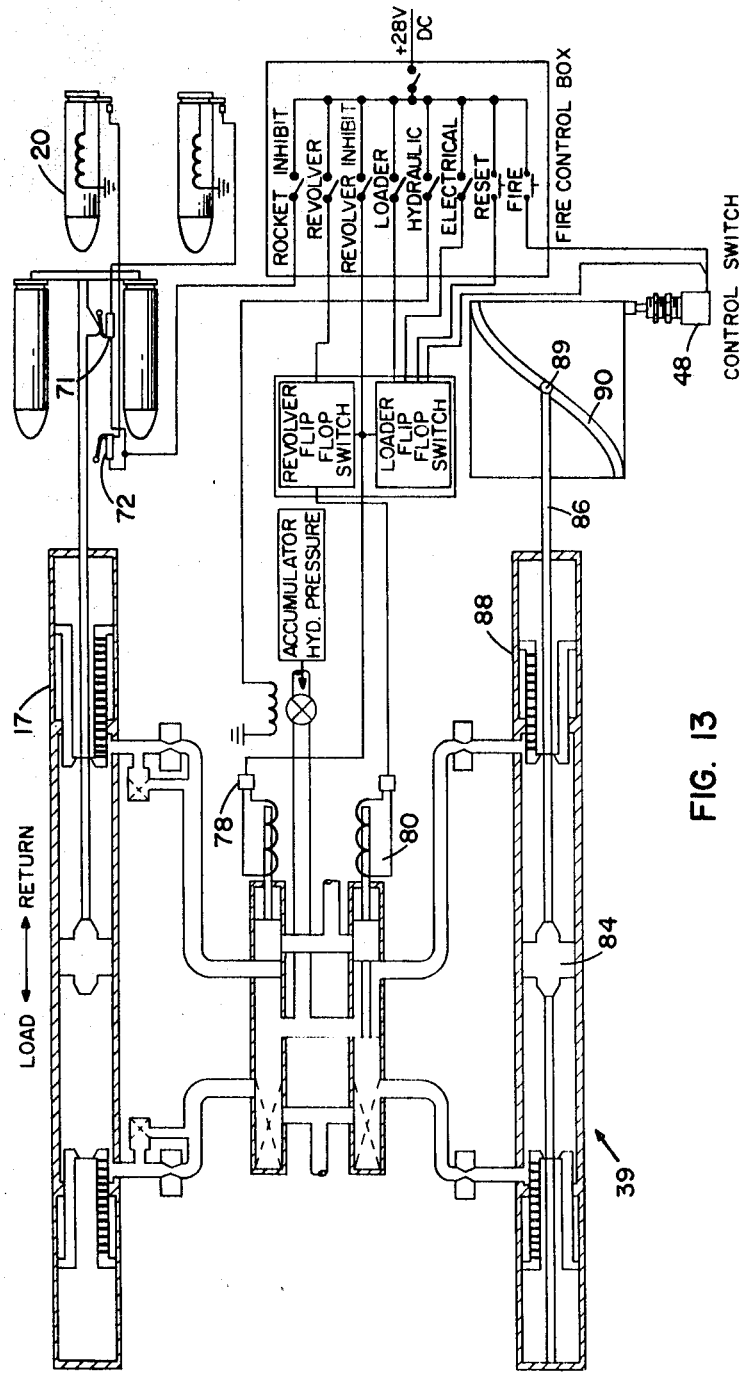

United States Patent Office 3,618,451
Patented Nov. 9, 1971

3,618,451
LOADER MECHANISM FOR AN AUTOMATIC ROCKET LAUNCHER
Arthur A. Smith, Huntsville, Ala., assignor to the United States of America as represented by the Secretary of the Army
Filed Nov. 3, 1969, Ser. No. 873,338
Int. Cl. F41f 3/04, 9/00
U.S. Cl. 89—1.804                            7 Claims

ABSTRACT OF THE DISCLOSURE

A loader mechanism for loading a plurality of rockets into an open breech high rate automatic launcher while simultaneously launching a second plurality of rockets. The launcher is an automatic high rate, open breech launcher fed by a four cylinder revolver which generates rotary reciprocating motion. The loader mechanism loads a pair of rockets in a pair of the cylinders of the revolver while a second pair of rockets are fired from a second pair of cylinders of the revolved. Two rounds are loaded and two rounds are fired each half cycle. A pair of hydraulic double acting cylinders actuated by a pair of solenoid valves serve to actuate the launcher. One hydraulic cylinder rotates the revolver to align the chambers with the launch tubes while the second hydraulic cylinder actuates the loading mechanism for performing the loading function, reciprocates the revolver to seal and align the firing chambers with the launching tubes, retracts the revolver to break the seal between the tubes and revolver chambers. A pulsing switch operated by revolver motion serves to actuate the pair of solenoid valves to actuate the hydraulic cylinders.

The rockets fired from the launcher may be the type which includes a propulsion system having a boost phase and an after-boost sustain phase. The rocket boost phase occurs wholly within the launcher tube at all temperatures. The ignition system of the boost and sustain phases is incorporated in the system in a manner which insures that no debris (wires, metal parts, etc.) is ejected from the rear of the launcher tube on firing. Booster thrust termination and ignition of the sustainer motor occurs within the launcher tube and the tube serves as the combustion chamber for the motors.

SUMMARY OF THE INVENTION

The loader mechanism of the present invention includes a member disposed for engaging a pair of rockets carried in a pair of loading trays and transporting the rockets to a four cylinder revolver for release of the rockets therein and ignition thereof.

It is, therefore, an object of the present invention to provide a loader mechanism for a rocket launcher.

It is another object of the present invention to provide a loader mechanism for an open breech high rate rocket launcher.

It is a further object of the present invention to provide a loader mechanism for loading a pair of rockets in the launcher, simultaneously with the firing of another pair of rockets.

It is yet a further object of the present invention to provide such a loader mechanism for removing a pair of rockets from loading trays and transferring them into two barrels of a four barrel revolver under controlled velocity, final position, and detachment.

It is a still further object of the present invention to provide a rocket launcher in which the rounds being rammed into the revolver automatically ejects any duds or misfired rounds remaining in the revolver.

Other objects and advantages will be apparent after a study of the following detailed description taken in conjunction with the drawings.

BRIEF DESCRIPTION OF THE DRAWINGS

FIG. 13 is a schematic diagram of the launcher system.

DESCRIPTION OF THE PREFERRED EMBODIMENT

Figure 1:
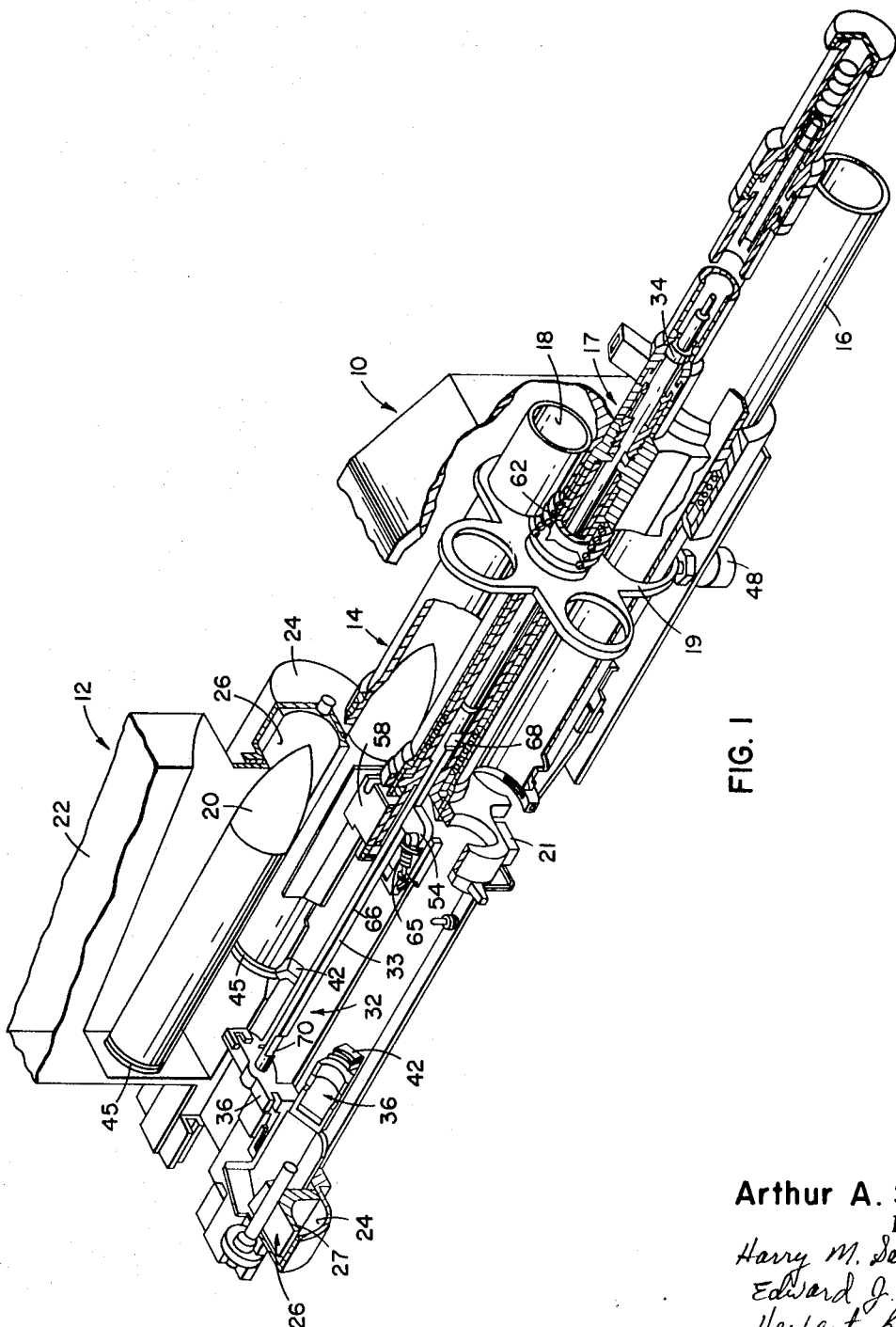
FIG. 1 is a perspective view, partially cut-away, of the launcher having missiles loaded therein.

As shown in FIG. 1, a rocket launcher 10 includes a loader mechanism 12, a rotatable reciprical revolver section 14, a pair of launch tubes 16 and a hydraulic actuating assembly 17 for receiprocating movement of revolver 14. The revolver section includes four chambers, 18, supported by a pair of yokes 19 and 21 concentrically about hydraulic actuating assembly 17. Two of the chambers are disposed for alignment with the launch tubes to fire rockets 20 therefrom while the other two chambers are being loaded with another pair of rockets.

Figure 2:
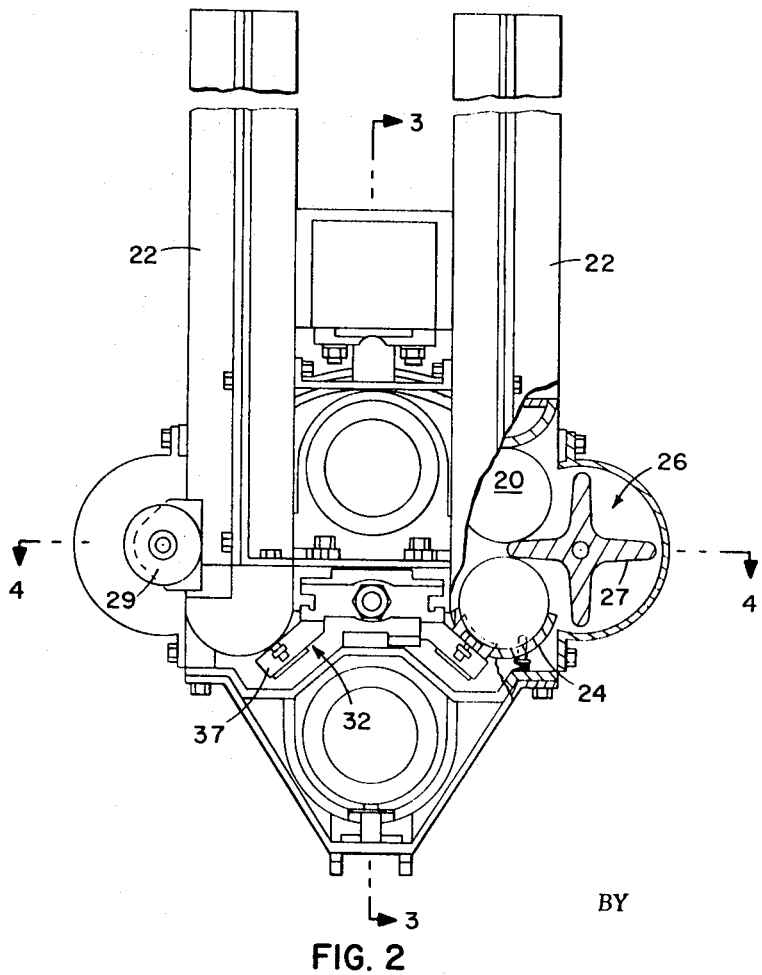
FIG. 2 is an elevational view, partially in section, of the rear of the launcher.

The loader mechanism (FIGS. 1 and 2) is provided with a pair of loading chutes 22 and a pair of trays 24 communicating with the chutes. Each chute and tray is separated by a starwheel mechanism 26. The movement of the round is downward while in a horizontal position within the loading chute. Movement is effected by the combined force of gravity plus a leaf spring assembly (not shown) in the top of the chutes. The leaf spring design provides that the spring rate and loaded height apply a 3 g load on the rounds in the chutes. As the rounds are moved out of the trays to the revolver, the spring load decreases so as to always maintain a 3 g load on the rounds in the chute. The motion is intermittent, all rounds moving simultaneously after the bottom round is rammed forward into the revolver loading chamber. The bottom round is separated from the stack above by starwheels 26 which support the stack in a horizontal fashion to prevent jamming during the loading stage. The starwheel includes four spokes 27 and is made of nylon and engages the rocket along the whole cylindrical body longitudinally. As the starwheel turns, the next spoke of the starwheel positions between the round in the tray and the bottom round in the chute. This allows a low friction surface on which the round to be loaded can slide on without being in contact with the next round to come down. A form sprag clutch 29 permits only one direction of rotation of the starwheel, holds the round in the loader tray and aligns it with the revolver cylinder into which it is loaded. The two loading chutes straddle the rammer so that two rounds are handled jointly during each ram stroke.

Figure 3:
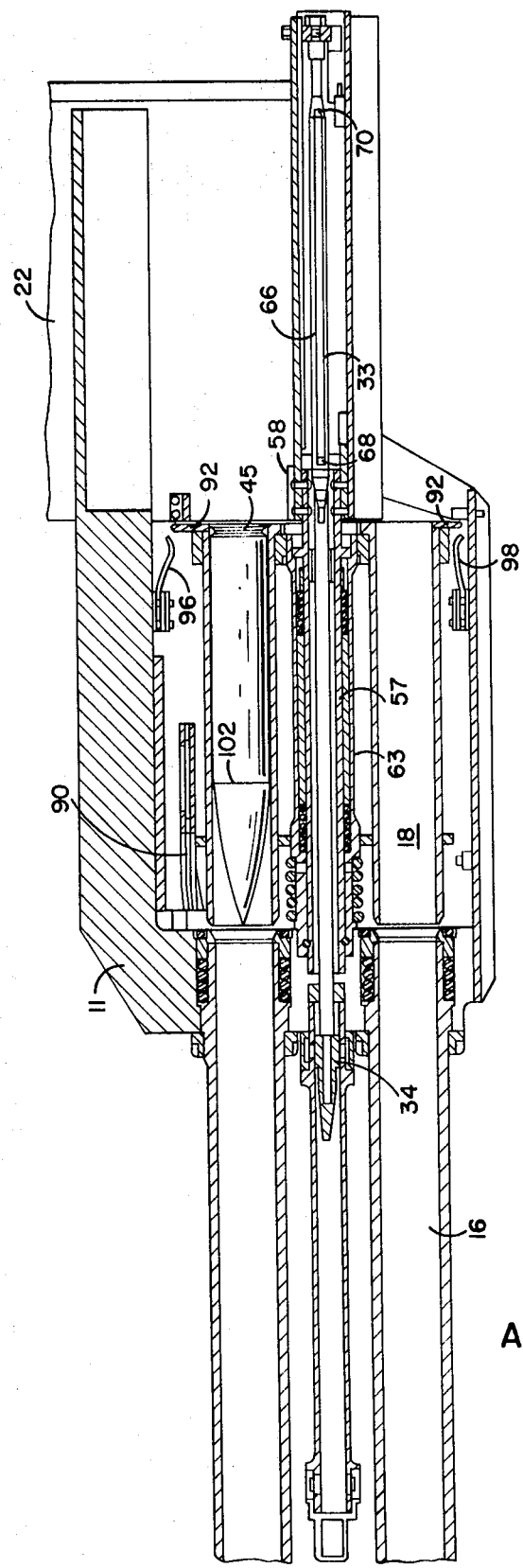
FIG. 3 is a sectional view along 3—3 of FIG. 2 illustrating the ram cylinder and loader arm.
Figure 4:
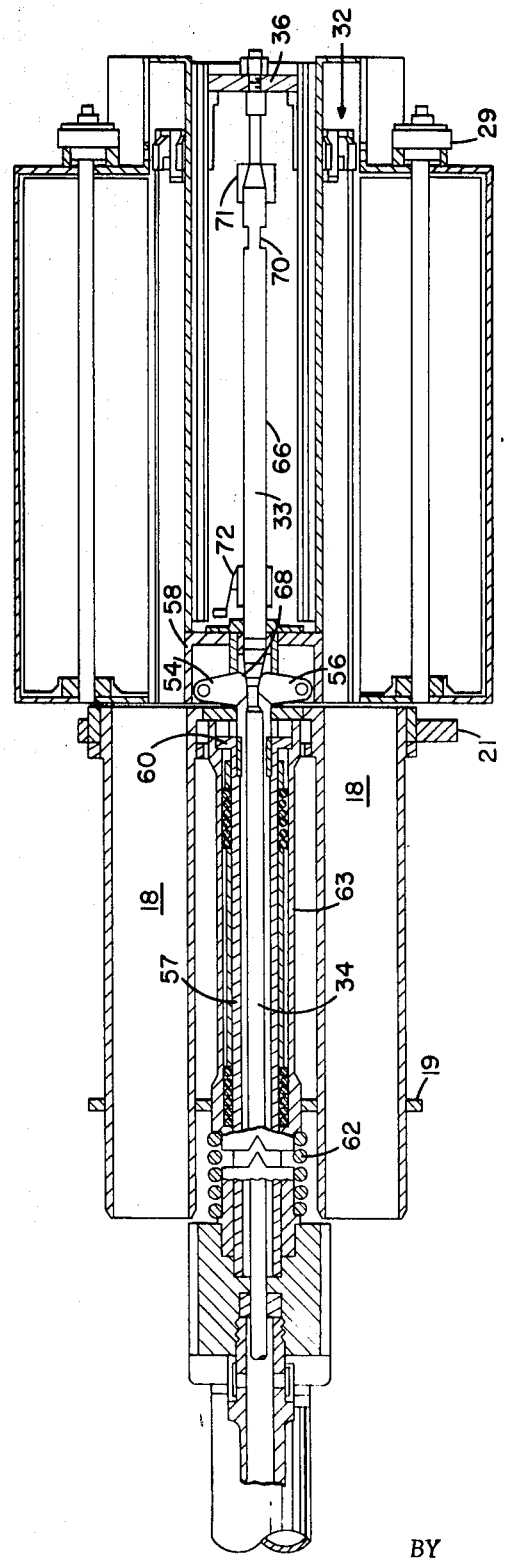
FIG. 4 is a view along line 4—4 of FIG. 2 and illustrates loading mechanism secured to the ram cylinder loader arm.

The loading mechanism of the present invention is disposed to move the rounds into the revolver section. Loading mechanism 32 (FIGS. 1, 2, 4 and 5) is powered by a hydraulic piston 34 (FIG. 3) for forward and rearward movement of mechanism 32. Mechanism 32 includes a loader arm 33 connected to piston 34 for movement therewith and having a loader support member 36 secured at one end thereof. The piston and arm are mounted along the axis about which each revolver chamber 18 is concentrically disposed.

Figure 7:
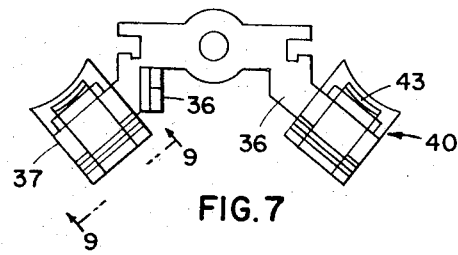
FIG. 7 is an elevational end view of the loader members and support member therefor.

Loader support member 36 (FIG. 7) includes a pair of downwardly extending elements 37 each having a loading member 40 at the ends thereof. A spring loaded detent 42 (FIGS. 8, 9 and 11) is slidably mounted at the forward end 44 of member 40 to rest in a detent ring 45 on the rocket (FIG. 1) when member 40 engages the rocket for loading thereof, to maintain positive control over the round during the loading operation. Movement of piston 34 carries the loader assembly forward and positions the rounds in the revolver.

Figure 8:
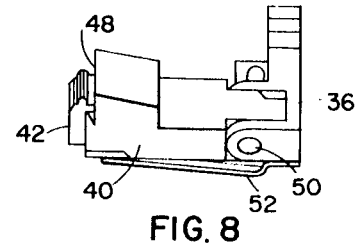
FIG. 8 is pictorial view of the loader and detent member therefor.
Figure 9:
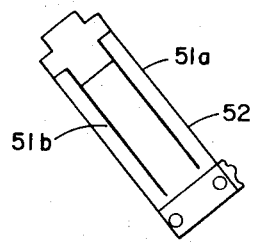
FIG. 9 is a view along line 9—9 of FIG. 7 illustrating the spring for biasing the loader and detent member.
Figure 10:
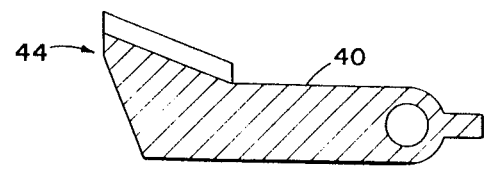
FIG. 10 is a sectional view of the loader member.
Figure 11:
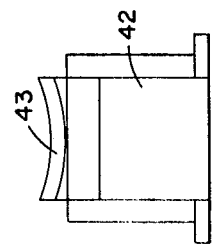
FIG. 11 is an elevational view of the detent member.

As seen in FIGS. 8, 10 and 11, detent member 42 is provided with an arcuate portion 43 having a radius substantially the same as the rockets. Portion 43 is provided to snugly fit in the cylindrical detent ring 45. Spring 52 (FIG. 9) is secured to member 36 and includes a pair of outer extended portions 51a and 51b on opposite sides of a central portion 53. Portions 51a and 51b extend from member 36 in biased relationship with detent 42 and central portion 52 extends from member 36 in biased relation with member 40.

Figure 6:
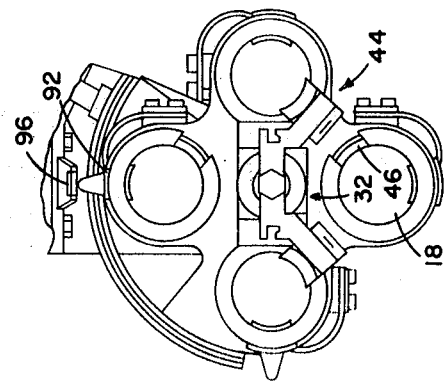
FIG. 6 is an end view of the revolver assembly taken along line 6—6 of FIG. 5.

After the loader arm reaches the end of its stroke, the revolver chamber is unlatched and caused to move to the rear to permit an angular surface 46 (FIG. 6) on the revolver chamber to engage loader detent 42 causing it to slide down and disengage from rocket detent ring 45. The face 48 of loading member 40 remains in position and holds the missile forward until the revolver reaches its rearmost position and locks into the round by a separate set of detents 92 (FIG. 3) mounted in the revolver cylinders for retention of the round in the revolver cylinder. A revolver rotating hydraulic piston assembly 39 coacts with a sinusoidal cam carried on the revolver section to rotate revolver 14, 90° to align the two empty chambers with the loading trays and the loaded chambers with the launch tubes in a manner to be discussed below.

Figure 5:
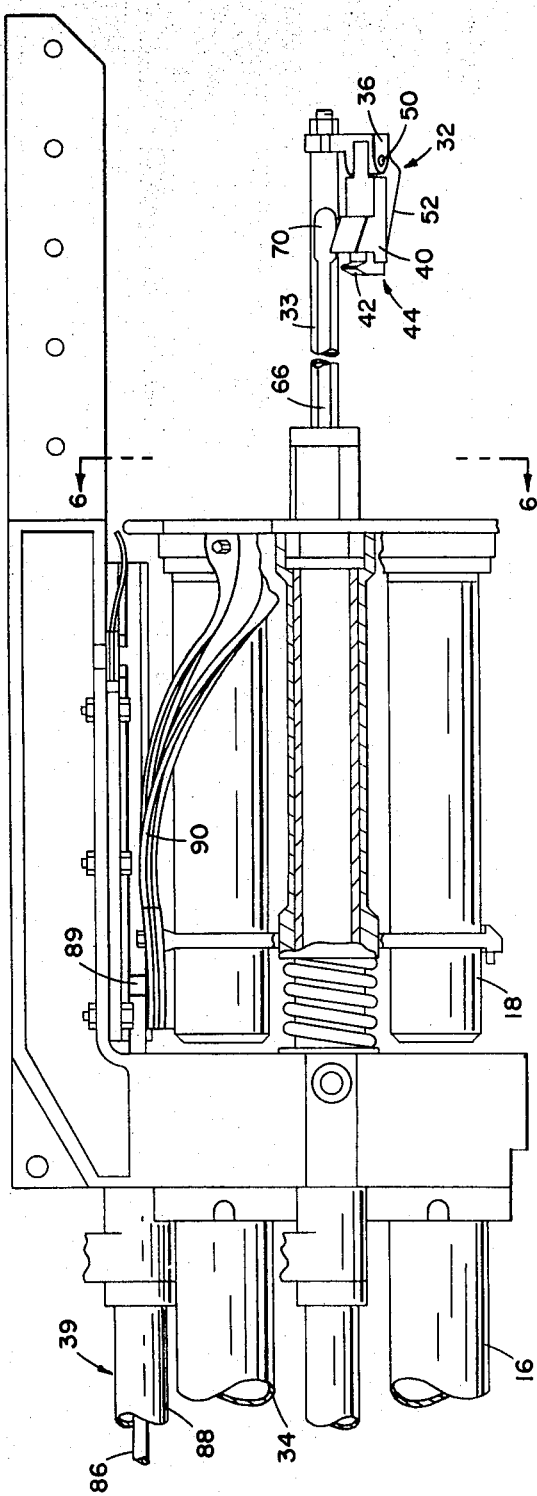
FIG. 5 is an elevational view, partially in section, of the revolver section and loader assembly.
Figure 12:
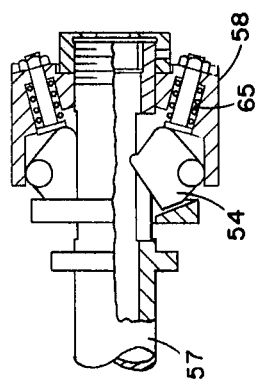
FIG. 12 is a sectional plan view of the cam dog assembly for obturation of the revolver section.

To permit the loader member 36 to return to pick up another round for loading thereof, the ram is moved rearward carrying the loading mechanism with it. As shown in FIG. 5 loading members 40 are pivotally mounted to support member 36 at 50 and spring loaded by spring 52 in the support member to retain their initial positions for the loading action. As the loader retracts responsive to rearward movement to piston 32, members 40 are forced to pivot down and ride the body of the next rocket to be loaded. When the loader reaches its rearmost position, loading members 40 are biased upward by spring 52, back up behind the round, detents 42 of members 40 engage rocket detent ring 45 for forward movement of the next pair of rockets.

With a pair of rockets in the chambers aligned with the launcher tubes, piston 32 and arm 34 move forward and carries with them the next pair of rockets to the other two chambers of the revolver. With the second pair of rockets in the chambers, pistons 32 move slightly forward and carry with them a pair of cam dogs 54 (FIGS. 1 and 4) which engage the revolver causing it to obturate for sealing of the two vertical cylinders of the revolver with the two launch tubes.

To accomplish obturation of the revolver, cam dogs 54 (FIGS. 9 and 10) secured in a cam dog housing 58 which is secured to a revolver support shaft 57 carried about arm 34 and secured to frame 11. A revolver chamber support tube 63 (FIGS. 1, 3 and 4) is slidably mounted about support shaft 57 and each revolver chamber is secured to support tube 63 by yokes 19 and 21 for movement with the support tube 63. Cam dogs 54 are disposed for engagement with a pressure plate 60 for engagement thereof with the revolver section to force the revolver section forward against the force of a spring 62 carried about the cylinder of piston 34 and secured to the frame 64 of the launcher. The forward movement of the revolver forces the revolver chambers in sealed relation with the launch tubes.

To permit engagement of cam dog 54 with the revolver section, loader arm 33 is provided on opposite sides thereof with a longitudinal cam 66 (FIGS. 1, 4 and 5) having a pair of recesses 68 and 70 at opposite ends thereof. When piston 32 and arm 34 move forward the cam dogs rise out of forward recess 68 to ride along longitudinal cams 66. In this position, the cam dogs are in engagement with pressure plate 60 of the revolver section, moving the revolver section forward into obturation position with the launch tubes and at the same time loader member 36 trips a switch 71, schematically shown in FIG. 13 firing the top tube. The ram piston 32 continues to a second position (while revolver and tubes are obturated) until a second switch 72 is tripped closed and the rocket in the bottom tube is fired. When the piston has reached its forward position of the stroke, the cam dogs fall into the rear recesses 70 of the cam and allows the revolver to be pushed back under force of spring 62. As the ram stroke retracts a spring 65 (FIGS. 1 and 13) rotates cam dogs 54 in an opposite direction and allows the cam dogs to slide back along the cam track until they drop back into recesses 68. During deobturation a pulsing switch 48 (FIG. 1) mounted exterior of the revolver, is depressed sending a signal to solenoid valves 78 and 80 (FIG. 13) which retracts piston 34 and initiates the next cycle by energizing a second assembly 39 to rotate the revolver.

To rotate the revolver after a pair of rockets have fired the second piston assembly 39 includes a piston 84 provided with a rod 86 which extends out of a piston cylinder 88. Rod 86 is provided with a cam follower 89 at the end thereof which rides in a sinusoidal cam track assembly 90 disposed about the periphery of the revolver section. After the first pair of rockets have been fired, solenoid valve 80 is actuated to permit hydraulic fluid to move piston 84 of assembly 39 to rotate the revolver section to align the second pair of chambers with the launcher tubes. The same 90° arc is used clockwise and then counterclockwise for each succeeding cycle of the launcher's operation.

The pulses for control are obtained from control switch 48. The switch is closed by a cam 91 carried on the loader support member 36 (FIGS. 1 and 7) as the revolver completes rotation, opens as the revolver forward obturates, closes as the revolver rear obturates and opens as the revolver begins rotation. The electrical control system is more fully set forth in an application filed Feb. 14, 1966, Pat. No. 3,331,284, by Frank H. Case, Jr., Edgar Losberg and Cobert M. Cornelison for "Electrical Control System" for Recoilless Cannon, issued July 18, 1967.

The hydraulic actuating valves are two position, two stage solenoid operated, i.e., when the solenoid is energized the hydraulic fluid flows in one direction and when the solenoid is de-energized the fluid flows in the opposite direction.

The rate of fire is 400 to 450 rounds per minute, firing two rounds 50 milliseconds apart on each half cycle.

The firing of the rockets is schematically shown in FIG. 11 and is accomplished by closing the two firing switches 71 and 72 as discussed above. After the rocket loader begins forward travel, the first switch 71 is closed completing the electrical circuit to the top rocket chamber, and as the loader approaches the end of forward travel the second switch 72 is closed, completing the electrical circuit to the bottom rocket chamber.

To insure that the electrical circuit to the rocket is not completed until the revolver forward obturates and to insure that only the two rockets which are aligned with the launcher tubes will be fired, pins 92 are electrically connected to switches 71 and 72 respectively, through a pair of firing springs 96 and 98 (FIG. 3) mounted externally of the revolver section. When the revolver rotates to its 90 degree rest position (in alignment with the launcher tubes) and forward obturates, the firing springs engage the detents of the chambers in alignment with the launch tubes. The detent pins are moved inwardly under spring force to engage contact band 45 (FIGS. 1 and 3) on the rocket. At this point in the cycle, the ground contact and firing circuit contacts are closed, leaving only switches 71 and 72 open. The firing switches are closed responsive to revolver movement as described, supra, to launch the rockets in sequence which permits the maximum time interval between the pair of rockets which is consistent with the ignition delays, thrust build up and gas evacuation times predicated by the rocket characteristics interrelated with the launcher.

The rocket 20 (FIGS. 1 and 3) includes booster and sustainer motors and an obturating ring 102 is located just aft of heat of the rocket and prevents booster motor gas blow-by and can act as the ground leg of the firing circuit.

The contact band includes a contact ring electrically isolated from the metal parts of the missile and electrically connected to squibs (not shown) in the booster and sustainer motor. The launcher detent pins 92 fit into the contact ring and holds the rocket in the position during loading and cycling operations and completes the electrical circuit to the motor for ignition thereof.

I claim:
1. An open breech, high rate, automatic rocket launcher comprising:
   (a) storage means having a plurality of rockets therein;
   (b) support means having a pair of launch tubes secured thereto;
   (c) a revolver section including a plurality of barrels each having a chamber therein; said revolver section disposed for rotary movement for alignment with said launch tubes and for reciprocating movement between said storage means and said launch tubes;
   (d) firing circuit means disposed for energization for supplying electrical energy to said rockets for ignition thereof;
   (e) loader means supported on said support means for reciprocal movement between said launch tubes and said storage means, said loader means including a support member having a pair of loading members secured thereto, said loading members having detent means thereon for engagement with a pair of rockets carried in said storage means and means for pivotally securing said loading members to said support member for release of said rockets in said revolver section responsive to movement thereto.

2. A rocket launcher as set forth in claim 1 wherein said loader means is provided with cam thereon for engagement with said firing circuit means during the reciprocal movement.

3. A rocket launcher as set forth in claim 2 wherein said loader means includes an arm having a support member secured to the distal end thereof, said loading members disposed in secured relation with said support member on opposite sides of said arm.

4. A rocket launcher as set forth in claim 3 including biasing means for biasing said loading member and said detent means in engagement with said rocket during the loading thereof into said revolver section.

5. A rocket launcher as set forth in claim 4 wherein said biasing means includes a spring secured to said support member and having a pair of outer portions extending from said support member for biased engagement with said detent means, and an intermediate portion extending from said support member for biased engagement with said support member.

6. A rocket launcher as set forth in claim 5 wherein said detent means includes a member slidably disposed in said support member, said member having an arcuate tip portion having a radius substantially the same as the body of the rockets fired by said launcher.

7. A rocket launcher as set forth in claim 6 including hydraulic actuating means secured to said loader arm for reciprocating movement of said loader.

References Cited
UNITED STATES PATENTS

| | | | |
|---|---|---|---|
| 2,870,678 | 1/1959 | Girouard et al. | 89—47 X |
| 2,972,286 | 2/1961 | Marquardt | 89—155 X |
| 3,072,019 | 1/1963 | Wilson et al. | 89—47 X |
| 3,331,284 | 7/1967 | Case, Jr., et al. | 89—135 X |
| 3,505,927 | 4/1970 | Driscoll | 89—156 |

SAMUEL W. ENGLE, Primary Examiner

US. Cl. X.R.
89—33 ML, 155